July 31, 1973  W. E. MIKULSKI  3,749,654
METHOD FOR ELECTROLYTICALLY MACHINING HOLES IN HOLLOW ARTICLES
Filed Jan. 14, 1972
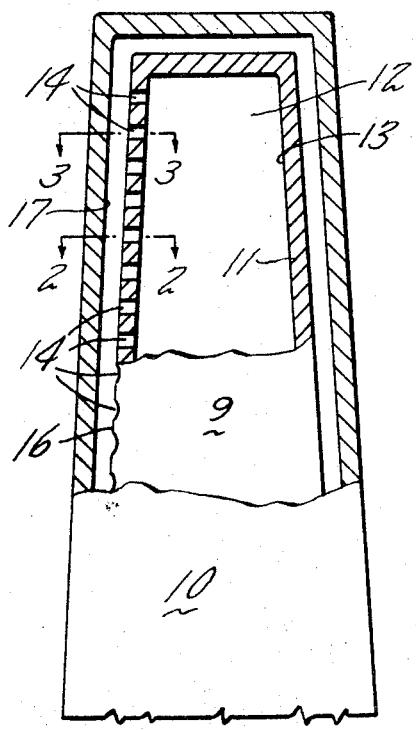
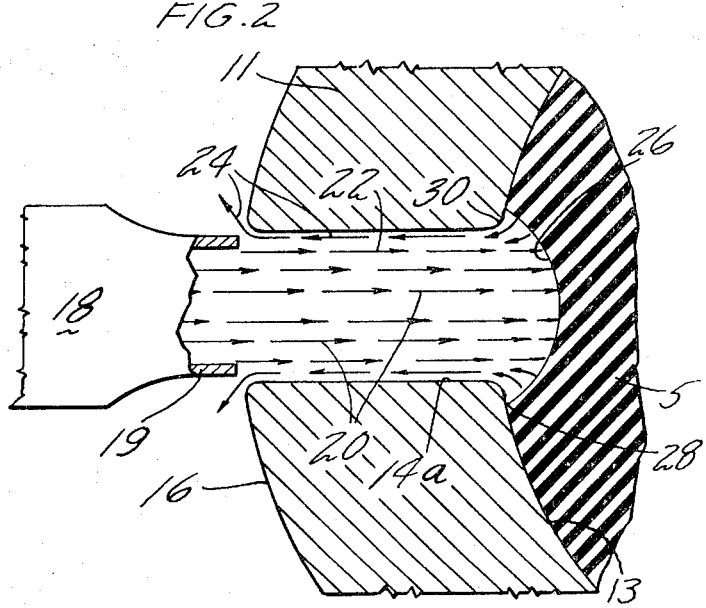
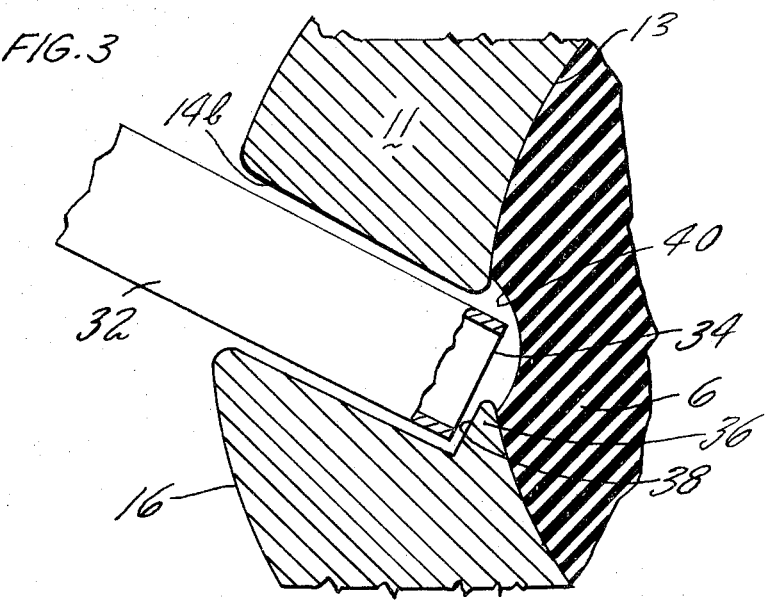

United States Patent Office 3,749,654
Patented July 31, 1973

3,749,654
METHOD FOR ELECTROLYTICALLY MACHIN-
ING HOLES IN HOLLOW ARTICLES
Walter E. Mikulski, Glastonbury, Conn., assignor to
United Aircraft Corporation, East Hartford, Conn.
Filed Jan. 14, 1972, Ser. No. 217,848
Int. Cl. B23p 1/02, 1/16
U.S. Cl. 204—129.65                                  6 Claims

ABSTRACT OF THE DISCLOSURE

In electrolytic machining of holes through the wall of a hollow article using a hollow electrode through which an electrolyte is pumped, the article is filled with a dielectric material and the holes are then machined completely through the wall of the article. The dielectric material prevents electrolyte from contacting the internal surface of the article after the holes break through the wall. After machining the holes the dielectric material is removed from the article.

BACKGROUND OF THE INVENTION

Field of invention.—This invention relates to the electrolytic removal of material from a workpiece and more particularly to an improved method for electrolytic machining of holes in a hollow workpiece.

Description of the prior art.—Two of the more basic techniques of electrolytic material removal are electromechanical machining (hereinafter referred to as ECM) and electrochemical impingement drilling (hereinafter referred to as ECID™, a trademark of United Aircraft Corporation).

The former technique is described in U.S. Pat. No. 3,058,895 to Williams, and is accomplished by advancing a hollow electrode into the workpiece while an electrolyte under pressure is pumped through the hollow portion of the electrode and out the tip. A thin layer of electrolyte under pressure is maintained between the tip of the electrode and the workpiece. A current is passed from the electrode, which is negative, through the electrolyte and into the workpiece, which is positive. The hole created by electrolytic machining is slightly larger than the size of the electrode, so that material removed by the electrolytic reaction is carried away from the workpiece around the outside of the electrode by the flowing electrolyte.

The latter process, ECID™, is described in U.S. Pat. No. 3,403,084 to Andrews and involves directing a stream of current carrying electrolyte through a hollow electrode and onto the workpiece. The negatively charged electrolyte stream impinges on the positively charged workpiece, removing material by electrolytic action. Depending on the length and diameter of the hole to be drilled, the workpiece and the electrode may or may not need to be moved toward each other during this process.

In some applications, such as the electrolytic machining of holes through the wall of a hollow workpiece, such as a hollow turbine blade or an impingement tube for a hollow turbine blade, there may be a serious problem once the electrolyte breaks through the wall on the inside of the workpiece. For example, when this occurs during the ECID™ process the stream of electrolyte may impinge upon the wall on the other side of the workpiece cavity causing damage thereto as the result of electrolytic action. One solution to this problem is shown in U.S. Pat. No. 3,290,237 to Abt et al. The device of that patent is designed to produce interconnecting passageways between existing parallel, adjacent passageways. This is done by means of a specially designed electrode which is inserted in the existing passageway. The electrode has small holes along its length which direct streams of electrolyte against the surface of the passageway for cutting holes through the material which separates said passageway from an adjacent passageway. In order to prevent damage to the wall of the adjacent passageway once the electrolyte breaks through to the adjacent passageway it is suggested that a dummy core be inserted in the adjacent passageway to act as a barrier between the stream of electrolyte and the wall of the adjacent passageway. There are a number of problems with this technique, the most obvious being that the shape or position of the passageway may not permit insertion of a dummy core. Even if it were possible to use this technique, there are several reasons why it may not be desirable. For example, if the dummy core fits tightly against the inside wall of the cavity, then the machined hole will have a very sharp edge at the point where it breaks through the wall; in highly stressed turbine blades this is an undesirable and often intolerable condition. Also, a slight gap between the dummy core and the wall of the cavity may allow electrolyte to flow around the dummy core; impingement of the negatively charged electrolyte stream on the dummy core will cause the dummy core to become negatively charged; the dummy core, negative charged and surrounded by a thin layer of electrolyte, may now act as the cathode of an electrochemical machining (ECM) device and cause damage to the wall of the passageway.

The ECM process, when used for machining holes, also involves several problems. One problem, which is recognized in the above mentioned Williams patent, is that breakthrough of the hole at the back side of the workpiece usually occurs on one side of the hole before the hole is finished; this can result in a loss of electrolyte pressure between the tip of the electrode and the workpiece, resulting in the electrode contacting the workpiece and causing a short circuit. Williams suggests securing a backing plate of metal or some resilient plastic sponge material to the backside of the workpiece; this would allow the electrode to travel completely through the workpiece with no escape of electrolyte when breakthrough occurs. This method, however, also results in a hole with a sharp edge. It is also immediately apparent that, for many applications such as machining holes through the wall of an impingement tube, it may be impossible to use a back-up plate; the backside of the workpiece would have to be readily accessible to use such a technique. Williams undoubtedly recognized this problem, for he recommends an alternate solution when the workpiece constitutes the shell of an enclosure. In that instance it is suggested that the internal cavity be filled with electrolyte. This may work well for applications where, once breakthrough occurs, removal of the last thin section of material happens substantially instantaneously. However, if the hole axis is not perpendicular to the surface of the cavity, breakthrough on one side of the hole will occur well before finishing the hole. The electrolyte in the cavity will exit through this break and, as the break becomes larger, a pressure loss in the electrolyte film at the tip of the electrode becomes more likely. This technique also produces a sharp opening and may result in unwanted electrolytic action at the surface of the far side of the cavity if the electrode penetrates too far into the cavity.

SUMMARY OF INVENTION

One object of the present invention is improved electrolytic machining of holes through the wall of a hollow workpiece.

Another object of the present invention is protection of the internal surface of a hollow workpiece during electrolytic machining of holes through the wall of said workpiece, particularly where said internal surface is not readily accessible or is of complex contour.

A further object of the present invention is elimination of the sharp edge of holes electrolytically machined through the wall of a hollow workpiece.

Accordingly, the present invention comprises positioning a suitable dielectric material within the hollow cavity of a workpiece at least against the area through which the holes are to be machined, electrolytically machining at least one hole completely through the wall of said workpiece, and removing said dielectric material.

More particularly, in one embodiment of the present invention the hole may be machined by an electrolytic process such as ECID™ or ECM. When the electrolyte breaks through the wall at the inside surface of the hollow workpiece, it carves out a pocket of dielectric material within the workpiece slightly larger than the diameter of the machined hole. The dielectric material thus prevents contact between the electrolyte and the interior of the hollow workpiece except for a small ring around the sharp edge of the hole; electrolytic action then removes this sharp edge. The dielectric is then removed such as by melting it out.

When ECM is the electrolytic machining process used in the practice of this invention, the dielectric material will prevent the loss of electrolyte pressure at the electrode tip upon breakthrough of the hole into the interior of the hollow workpiece. At the same time, a pocket of dielectric material is removed ahead of the approaching electrode tip, allowing full penetration of the electrode through the wall of the workpiece to finish the hole.

The foregoing and other objects, features and advantages of the present invention will become more apparent in the light of the following detailed description of preferred embodiments thereof as illustrated in the accompanying drawings.

BRIEF DESCRIPTION OF THE DRAWING

FIG. 1 is a partially sectioned, partially broken away view of a portion of a turbine blade with an impingement tube.

FIG. 2 is an illustrative, greatly enlarged cross-sectional view taken along the line 2—2 in FIG. 1 showing electrochemical impingement drilling of a hole in the impingement tube of FIG. 1.

FIG. 3 is an illustrative, greatly enlarged cross-sectional view taken along the line 3—3 in FIG. 1 showing electrochemical machining of a hole in the impingement tube of FIG. 1.

DESCRIPTION OF THE PREFERRED EMBODIMENT

As an example of a finished assembly which could advantageously be manufactured by the method of this invention, consider an impingement tube 9 (FIG. 1) positioned within a hollow turbine blade 10, only the tip end of the blade and tube being shown. The tube 9 may be of any cross-sectional shape, but in this embodiment it is airfoil shaped. The tube comprises a wall 11 forming a cavity 12 having a surface 13; also, a row of holes 14 (made by the method of this invention) through the forward edge 16 of said tube communicate with said cavity 12. Cooling fluid (usually compressed air) is pumped into the cavity 12 through an inlet at the root end of the tube (not shown) and exits through the holes 14, impinging upon the internal surface 17 of the blade 10, cooling said surface. To cool properly, the holes 14 must be very small, closely spaced and accurately located. They are machined prior to insertion of said tube 9 in said blade 10.

Accordingly, FIG. 2 illustrates one method of machining said holes in the manner of the present invention using ECID™ (electrochemical impingement drilling). A suitable dielectric material 5, whose properties and characteristics are hereinafter described, is positioned against the area of the surface 13 through which the hole is to be machined. How this is accomplished depends on the dielectric material selected. If a wax is used it may be heated and poured into the cavity 12 as a liquid; possibly the dielectric material could be softened to a clay-like consistency and pressed into place. It is then allowed to harden. The dielectric material should be a solid during the machining operation and must provide a seal at the backside of the hole. As hereinabove explained, an electrode 18 having a nozzle end 19 is brought into close proximity with the wall to be machined (11) and directs a current carrying electrolyte stream (represented by the arrows 20) against said wall. As the hole 14a is formed, electrolyte, after striking the wall 11, returns around the outside boundary 22 of the stream 20 and exits from the hole as indicated by the arrows 24. Upon breaking through the surface 13 of the cavity 12 the electrolyte stream 20 comes into contact with the dielectric material 5 in the cavity 12 and is prevented from impinging upon other portions of the surface 13 of the cavity. As can be seen in FIG. 2, a pocket 26 of dielectric material is removed by the impinging stream 20; this pocket 26 has a diameter at its edge 28 slightly larger than the diameter of the hole 14a, resulting in the removal of material from the edge 30 of the hole 14a, eliminating what would otherwise be an undesirable sharp corner. Upon completing the machining of the holes 14 in the tube 9 the dielectric material 5 is removed from the cavity 12. This may be accomplished by melting if the dielectric material is a wax. Other techniques may be used depending on the properties of the dielectric material chosen.

FIG. 3 illustrates the machining of a hole 14b according to the present invention using ECM (electrochemical machining). A dielectric material 6 is positioned within the cavity 12 in a manner similar to the example of FIG. 2. As hereinabove explained, an electrode 32 is moved into the workpiece (tube 9) as material is removed from the wall 11; the tip 34 of the electrode always remains in close proximity to the surface of the workpiece, separated by only a thin film of electrolyte (on the order of ½ to 5 mils) under pressure. In this example the axis of the hole 14b is not perpendicular to the surface 13 at the point where the hole breaks through said surface; thus the electrode will break through the surface at one side of the hole well before material such as at 36 on the other side of the hole has been removed. Had the cavity 12 been empty when breakthrough occurred there would have been a loss of electrolyte pressure between the tip 34 of the electrode 32 and the workpiece such as at 38, resulting in contact between the electrode tip 34 and the workpiece at 38, causing a short circuit; however, the use of a dielectric material in the cavity 12 prevents such an occurrence. A small pocket 40 of dielectric material 6 is removed ahead of the approaching electrode allowing it to complete the hole 14b without losing a significant amount of electrolyte pressure ahead of the tip 34 after breakthrough.

It should be clear that in the above processes the dielectric material must be chosen so that just the right amount of dielectric is removed during machining. If dielectric material is removed too quickly, it may result in exposing portions of the surface 13 to electrolytic attack causing damage to said surface. In the case of ECM, such as shown in FIG. 3, a small pocket 40 of dielectric material 6 is removed ahead of the approaching electrode tip 34. If the pocket becomes too large, a drop in the electrolyte film pressure may result and the electrode tip 34 may contact the workpiece at the surface 38; however, if the dielectric material is not removed fast enough, the electrode tip 34 may come into contact with said dielectric material, preventing completion of the hole 14b.

Erosion, melting and chemical action contribute to removal of the dielectric material during machining. Because electrolytic machining processes such as ECID™ and ECM may utilize widely divergent voltages, currents, electrolyte solutions, electrolyte pressures and temperatures, the best dielectric materials for each of these processes will usually be different. One process may work well with a dielectric material having a low melting point and being essentially insoluble in the electrolyte; another process may work well with a hard dielectric material having a high melting point and being easily dissolved by the electrolyte. Other considerations in selecting a dielectric material are that it should not contaminate the workpiece and it should be easily removable from the cavity. Given the parameters of the electrolytic process to be used, a dielectric material having the appropriate properties and characteristics may be selected. A number of waxes which are presently on the market may be suitable; however, other materials such as some epoxy resins or other kinds of plastics might be appropriate for some applications.

For example, a polyethylene glycol wax manufactured by the Dow Chemical Corporation having a manufacturer's identification number E-20,000 works well for electrochemical machining (ECM) of .034 inch diameter holes in nickel alloy (AMS 5586) using an electrolyte solution of 3.3% hydrochloric acid, an electrolyte pressure of about 40 p.s.i., an electrical potential of about 13 volts, and a current of about .3 amps, using an electrode having an outside diameter of .0285 inch and fed into the workpiece at a rate of .040 inch per minute.

As another example, Rigidax® WI-NMF, a wax compound made by Rigidax Division of M. Argueso & Company, Mamaroneck, N.Y., works well for electrochemical impingement drilling (ECID) of .040 inch diameter holes in a nickel alloy (AMS 5544) using an electrolyte solution of 15% hydrochloric acid, an electrolyte pressure of 250 p.s.i., an electrical potential of about 400 volts and a current of about 0.8 amps, using a hollow electrode having an inside diameter of .019 inch; in this example the hole was machined with its axis 30° from the surface of a 1/16 inch thick workpiece, and took about one minute to complete.

Although the invention has been shown and described with respect to preferred embodiments thereof, it should be understood by those skilled in the art that various changes and omissions in the form and detail thereof may be made therein without departing from the spirit and the scope of the invention.

Having thus described typical embodiments of my invention that which I claim as new and desire to secure by Letters Patent of the United States is:

1. A process for machining holes through the wall of a workpiece having an internal cavity, using a hollow electrode and an electrolyte pumped through said electrode, comprising the steps of :
    positioning a dielectric material inside the cavity into sealing relationship with a wall of said cavity in an area through which a hole is to be machined, to protect the internal surface of said cavity from electrolytic attack;
    electrolytically machining at least one hole completely through the wall of the workpiece in the area where said dielectric material is positioned, said dielectric material being susceptible to removal in controlled amounts upon breakthrough of said electrolyte through said wall;
    removing a small pocket of said dielectric material at the cavity end of said hole by said electrolyte contacting said dielectric material during said machining, the pocket having a diameter at the wall slightly larger than the diameter of said hole to expose the sharp edge of said hole;
    electrolytically removing said edge during the hole machining process to reduce stress concentrations in the workpiece; and
    removing remaining dielectric material from said cavity after said hole is completed.

2. The process according to claim 1 wherein said step of positioning a dielectric material comprises positioning a wax.

3. The process according to claim 2 wherein the step of removing remaining said dielectric material comprises melting out said wax.

4. The process according to claim 1 wherein said step of positioning a dielectric material comprises positioning an epoxy resin.

5. A process for machining small holes through the wall of a workpiece having an internal cavity, using a hollow electrode and an electrolyte pumped through said electrode, comprising the steps of:
    pouring a liquid dielectric material inside the cavity so it covers an area through which a hole is to be machined, to protect the internal surface of said cavity from electrolytic attack, said material being a solid at the temperatures at which the machining is to be done;
    allowing said liquid dielectric material to harden to a solid;
    electrolytically machining at least one hole completely through the wall of the workpiece, said dielectric material being susceptible to removal in controlled amounts upon breakthrough of said electrolyte through said wall;
    removing a small pocket of said hardened dielectric material after the hole breaks through the wall by said electrolyte contacting said dielectric material during said machining, the pocket having a diameter at the wall slightly larger than the diameter of said hole to expose the sharp edge of said hole;
    electrolytically removing said edge while completing the machining of said hole, to reduce stress concentrations in the workpiece; and
    removing remaining hardened dielectric material from said cavity by melting.

6. The process according to claim 5 wherein the step of pouring said liquid dielectric material comprises pouring a liquid wax.

References Cited

UNITED STATES PATENTS

| | | | |
|---|---|---|---|
| 3,290,237 | 12/1966 | Abt et al. | 204—ECM DIG |
| 3,383,296 | 5/1968 | Trager | 204—ECM DIG |
| 3,403,084 | 9/1968 | Andrews | 204—ECM DIG |
| 3,440,161 | 4/1969 | Williams | 204—ECM DIG |
| 3,386,907 | 6/1968 | Abt | 204—297 R |
| 3,176,387 | 4/1965 | Argueso, Jr., et al. | 29—423 |

FREDERICK C. EDMUNDSON, Primary Examiner

U.S. Cl. X.R.

204—129.1, 224 M